United States Patent
Tilch et al.

[11] Patent Number: 5,129,742
[45] Date of Patent: Jul. 14, 1992

[54] ROLLER BEARING FOR ANTI-LOCKING BRAKE SYSTEM

[75] Inventors: Gerhard Tilch, Schweinfurt; Ortwin Harsdorff, Uchtelhausen; Horst Back, Gochsheim, all of Fed. Rep. of Germany

[73] Assignee: SKF GmbH, Schweinfurt, Fed. Rep. of Germany

[21] Appl. No.: 587,634

[22] Filed: Sep. 21, 1990

Related U.S. Application Data

[63] Continuation of Ser. No. 354,494, May 19, 1989, abandoned.

[30] Foreign Application Priority Data

May 20, 1988 [DE] Fed. Rep. of Germany ....... 3817175

[51] Int. Cl.⁵ .................. F16C 19/18; G01P 3/481
[52] U.S. Cl. ................... 384/448; 324/173; 384/446
[58] Field of Search .............. 384/446, 448, 449, 571, 384/568, 624; 340/682; 310/168; 324/173, 174, 207.25

[56] References Cited

U.S. PATENT DOCUMENTS

| | | | |
|---|---|---|---|
| 3,716,788 | 2/1973 | Nishida | 310/155 X |
| 3,826,933 | 7/1974 | Anselmino | 384/448 |
| 3,868,151 | 2/1975 | Derner | 384/569 |
| 4,069,435 | 1/1978 | Wannersakog et al. | 384/446 X |
| 4,333,695 | 6/1982 | Evans | 384/571 X |
| 4,778,286 | 10/1988 | Kodokawa | 384/448 X |
| 4,783,180 | 11/1988 | Hayashi | 384/448 |
| 4,795,278 | 1/1989 | Hayashi | 384/448 |

FOREIGN PATENT DOCUMENTS 2218047  9/1974  Fed. Rep. of Germany .

Primary Examiner—Lenard A. Footland
Assistant Examiner—William G. Battista, Jr.
Attorney, Agent, or Firm—Rosen, Dainow & Jacobs

[57] ABSTRACT

A rolling bearing arrangement for an anti-locking brake system has a pulse ring with projections directed toward the fixed ring. The surfaces of the projections that activate the pulse generator are cut during the hard working of the bearing ring. The pulse generator is integrated in the rolling bearing arrangement. Thereby, on one hand, tolerance limited operational differences in the amplitude and shape of the pulses are avoided, especially during slow rotational speeds of the bearing ring. Furthermore, external influences on the pulse generator and pulse ring caused by rough roads do not occur due to the hermetic encapsulation of the sensitive components.

1 Claim, 1 Drawing Sheet

ROLLER BEARING FOR ANTI-LOCKING BRAKE SYSTEM

This application is a continuation of application Ser. No. 354,494 filed May 19, 1989, now abandoned.

BACKGROUND OF THE INVENTION

This invention related to a rolling bearing arrangement for anti-locking brake (ABS) Systems.

A rolling bearing arrangement of this type is disclosed, for example, in DE-AS 2,218,047. In this arrangement, a pulse generator is mounted adjacent the side flange of the bearing, the pulse generator having the required connections to suitable ABS electronic circuits. A separate pulse ring is affixed to the side of the rotating bearing ring. The pulse ring has radially extending fingers, with recesses intermediate the fingers. Upon rotation of the bearing ring the fingers must pass along the active end face of the pulse generator with the least possible spacing, in order to produce sufficiently high voltage pulses even during relatively low speeds of rotation of the rolling bearing, i.e. when a vehicle upon which the bearing is mounted is moving at very slow speeds. As a result of the separate production of the pulse ring in the known arrangement and the necessity to fasten the pulse ring to the respective bearing ring, faults can arise, especially in the mass production of the assembly, so that constant results with respect to the generation of pulses by the pulse generator cannot be guaranteed. Comparable fault sources are also introduced by the additional step of attachment of the pulse generator to the bearing assembly. Moreover there is a great danger of thrown stones when travelling on rough roads. In the above arrangement this can lead to damage of the system unless suitable encapsulation has been provided.

SUMMARY OF THE INVENTION

It is therefore the object of the invention to provide a rolling bearing arrangement of the above described type, in which the pulse generator system provides constant operational characteristics that are dependent to a minimum upon manufacturing and assembly tolerances and that remains largely undamaged in operation as a result of outside influences.

This object is achieved, in accordance with the invention, by providing a pulse ring that is formed as a unit with the rotating bearing ring.

In accordance with the invention, the projections and recesses of the pulse ring are formed directly in the material of the respective bearing ring. The forming of the projections is preferably effected during the ductile working of the bearing ring by pressing, rolling, broaching, etc., for example in the shoulder region of the race. Depending upon the arrangement of the pulse generator, the projections can be formed to extend axially, radially or inclined to the axial direction. The surfaces of the projections used for activation of the pulse generator are formed in like manner during the processing of the bearing in the hardened state, by grinding. As a consequence, absolute correct concentricity of the projections is provided, and it is ensured that a precise spacing is provided, with respect to the pulse generator, that is the same for all projections. As a result, the pulse generator can be positioned with an extremely small spacing to the pulse ring. As a consequence the invention provides the advantage that in the use of a given pulse generator, each of the relatively large number of pulses generated during a rotation of the rolling bearing arrangement have the same electrical amplitude, flank steepness and pulse width. In addition, as a result of the minimum size of the gap between the pulse generator and the pulse ring, a high pulse voltage is obtained even with minimum rotational speeds.

In accordance with a further feature of the invention, the pulse generator is integrated in the rolling bearing arrangement. Due to the incorporation of the projections and recesses in the race of the bearing, the space that would otherwise be necessary for a separate pulse ring is no longer required. This space can be used advantageously for the pulse generator, i.e. the pulse generator can be mounted inside of the outer periphery of the rolling bearing arrangement. The arrangement in accordance with the invention is consequently not influenced to any significant extent by external effects and provides reliable operation on rough roads.

BRIEF DESCRIPTION OF THE DRAWING

In order that the invention may be more clearly understood, it will now be disclosed in greater detail with reference to the accompanying drawing, wherein:

The single figure of the drawing illustrates a cross sectional view of a two row rolling bearing arrangement in accordance with the invention, the figure illustrating the bearing only on one side of the axis thereof.

DETAILED DISCLOSURE OF THE INVENTION

Figure 1:
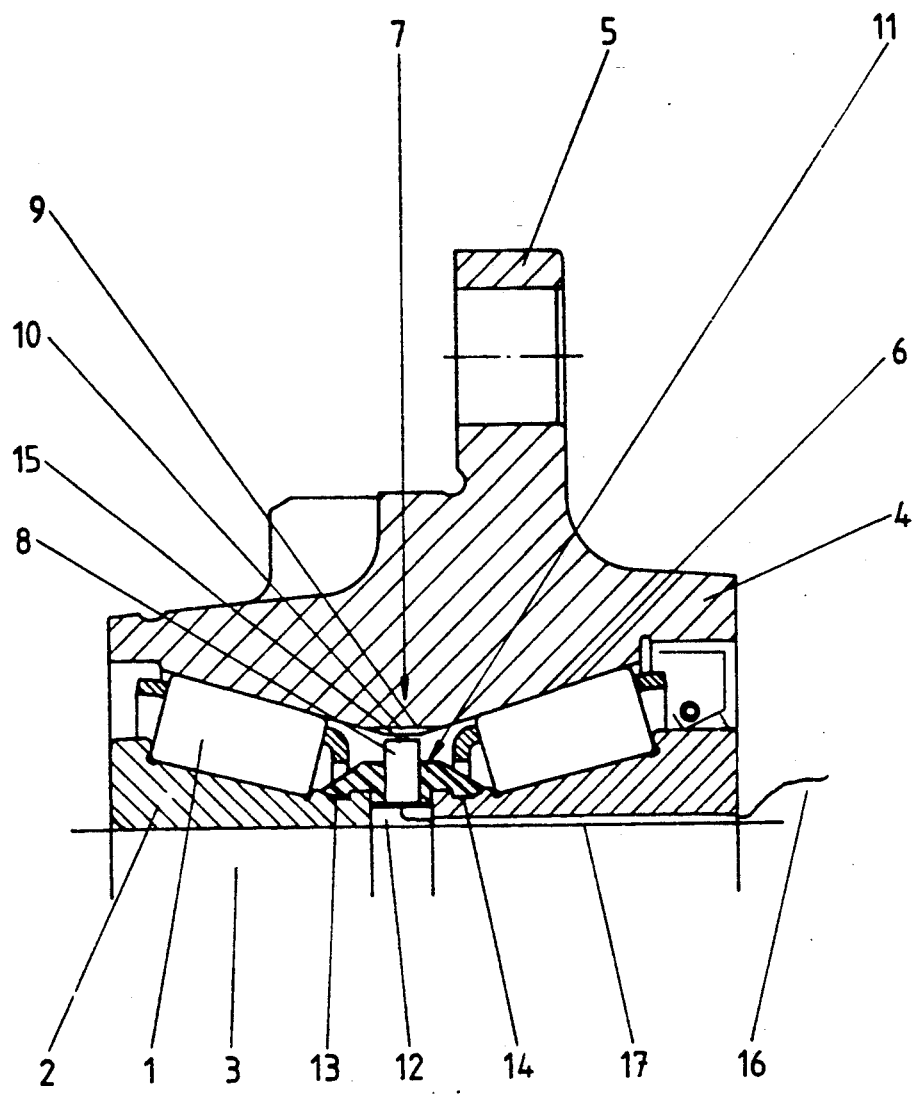

Referring now to the drawing, a two row rolling bearing for the wheel of a vehicle, in accordance with the invention, has two rows of tapered rollers 1. Two separated inner rings 2 of the bearing are fixedly mounted on an axle 3 (not illustrated), the outer ring 4 is formed as a single unit and has a flange 5 adapted to be mounted on a wheel (not illustrated). A pulse ring 7 for inducing pulses in a radially oppositely arranged pulse generator 8 of an anti-locking brake system is provided between the inclined races 6. The pulse ring 7 has a large number of radially extending projections 9 distributed about its circumference and extending radially toward the pulse generator, the projections alternating with intermediate recesses. The projections are formed directly in the material of the outer ring 4. The structure is thus somewhat in the form of inner teeth, only one projection 9 and one recess thereof being visible in the illustrated longitudinal section of the bearing. The inwardly directed ends 10 of the projections 9 are formed by a cylindrical grinding process during the processing of the outer ring 4 with the material thereof in a hardened state, so that they each form a part of a bore surface and lie precisely on the same reference circle.

The pulse generator 8 comprises an inductive coil embedded in a plastic material 11, the material 11 having a somewhat roof shaped profile section in the longitudinal cross section view, with a radially inwardly extending spacer portion 12. This inwardly extending spacer portion serves as a spacing or mounting ring for the two inner rings 2. Both of the annular sections of the roof profile section extending axially from the inwardly extending section 12 are formed as snap elements 13 that engage respective grooves 14 formed in the shoulders of the inner ring 2 to hold the inner ring in a form closing manner in the axial as well as the radial direction. The roof profile section continues with a cylindrical outer surface 21 at somewhat below the level as the active end surface 15 of the pulse generator 8 in the circumferential direction. The section 12 between the inner rings 2 extends to the vicinity of the bore surfaces of the inner rings and is recessed only in the region of the pulse generator 8 for accommodating the connection wires 16. The connection wires are guided through a groove 17 formed in the bore surface of the unloaded region of the inner ring 2 illustrated at the right of the figure, and are ensured in this position from falling out of the bearing ring before assembly.

In other embodiments of the invention, the connection wires can also be alternatively guided through corresponding recesses in the axle. In arrangements having rotating inner rings and fixed outer rings, the position of the pulse ring can also be reversed. The arrangement of the invention can also obviously be adapted for use in single row bearing.

While the invention has been disclosed and described with reference to a single embodiment, it will be apparent that variations and modification may be made therein, and it is therefore intended in the following claims to cover each such variation and modification a falls within the true spirit and scope of the invention.

What is claimed is:

1. In a rolling bearing arrangement for an anti-locking brake system composed of a plurality of rolling bearing rollers mounted to roll in corresponding bearing rings at least one of which rotates, an electrical pulse generator fixedly mounted to a mounting ring, and a pulse ring arranged on the rotating bearing ring for activating the pulse generator, the pulse ring having projections distributed about its circumference that are separated from one another by recesses, the improvement wherein entire rotating bearing ring and pulse ring and its projections are unitary and homogeneously formed of the same material, and the homogeneous faces of the projections are produced by circular grinding rotationally symmetrical to the axis of the rolling bearing arrangement, said mounting ring being affixed to a shoulder surface of one of said bearing rings, said pulse generator being mounted to said mounting ring, said rolling bearing arrangement comprising a two row rolling bearing having a first bearing ring that is split, said mounting ring being positioned between the split parts of said first bearing ring to serve as a spacing and holding ring for said split bearing ring parts.

* * * * *